United States Patent
Gonzalez et al.

(10) Patent No.: US 6,863,757 B1
(45) Date of Patent: Mar. 8, 2005

(54) METHOD OF MAKING AN EXPANDABLE MEDICAL DEVICE FORMED OF A COMPACTED POROUS POLYMERIC MATERIAL

(75) Inventors: Fernando Gonzalez, Campbell, CA (US); Srinivasan Sridharan, Morgan Hill, CA (US); Delma M. Blankenship, Sunnyvale, CA (US)

(73) Assignee: Advanced Cardiovascular Systems, Inc., Santa Clara, CA (US)

( * ) Notice: Subject to any disclaimer, the term of this patent is extended or adjusted under 35 U.S.C. 154(b) by 272 days.

(21) Appl. No.: 10/326,333

(22) Filed: Dec. 19, 2002

(51) Int. Cl.[7] .......................... B32B 31/00; B28B 11/08; B29C 49/08; B29C 55/00
(52) U.S. Cl. .......................... 156/86; 264/241; 264/267; 264/291
(58) Field of Search ............................ 156/86; 264/241, 264/267, 291

(56) References Cited

U.S. PATENT DOCUMENTS

| | | |
|---|---|---|
| 5,374,473 A | 12/1994 | Knox et al. |
| 5,395,332 A | 3/1995 | Ressemann et al. |
| 5,460,781 A * | 10/1995 | Hori et al. .................. 422/99 |
| 5,603,694 A * | 2/1997 | Brown et al. ............... 604/500 |
| 5,788,626 A | 8/1998 | Thompson |
| 5,868,704 A | 2/1999 | Campbell et al. |
| 5,916,194 A | 6/1999 | Jacobsen et al. |
| 6,016,848 A | 1/2000 | Egres, Jr. |
| 6,056,722 A | 5/2000 | Jayaraman |
| 6,071,285 A | 6/2000 | Lashinski et al. |
| 6,120,477 A | 9/2000 | Campbell et al. |
| 6,428,506 B1 | 8/2002 | Simhambhatla et al. |

FOREIGN PATENT DOCUMENTS

| | | |
|---|---|---|
| WO | WO 95/05555 | 2/1995 |
| WO | WO 97/02791 | 1/1997 |
| WO | WO 01/45766 | 6/2001 |

* cited by examiner

*Primary Examiner*—Stephen J. Lechert, Jr.
(74) *Attorney, Agent, or Firm*—Fulwider Patton Lee & Utecht LLP

(57) ABSTRACT

A method of making a catheter balloon or other expandable tubular medical device or component thereof formed of a compacted porous polymeric material, in which a tube of porous polymeric material is axially compacted, preferably without increasing the outer diameter of the tube, by positioning heat shrink material on the porous polymeric tube and heating the heat shrink material to decrease the length and diameter of the heat shrink material.

19 Claims, 3 Drawing Sheets

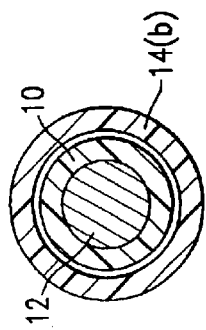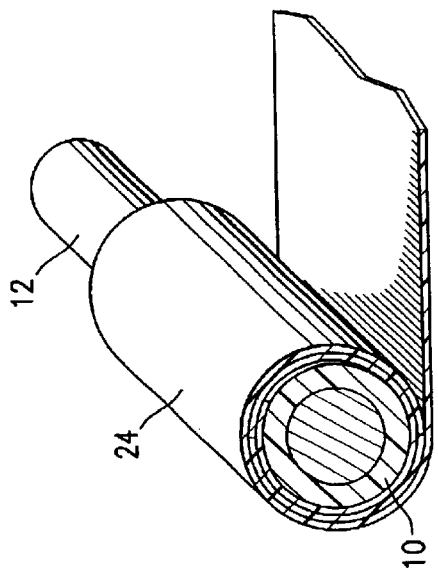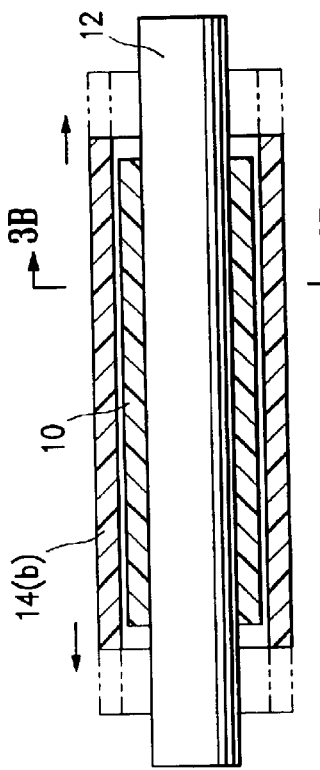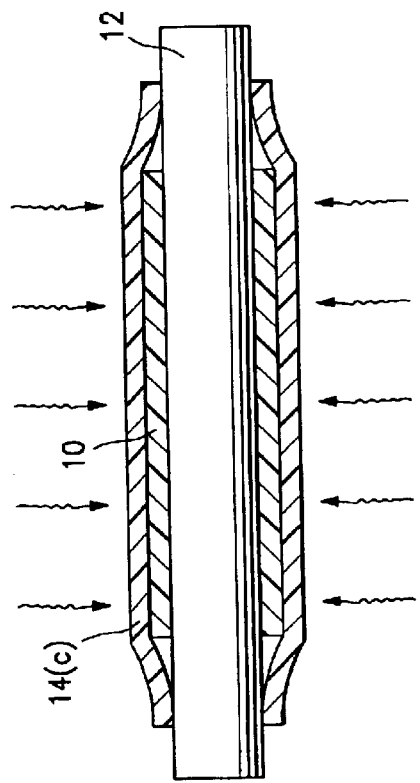

US 6,863,757 B1

METHOD OF MAKING AN EXPANDABLE MEDICAL DEVICE FORMED OF A COMPACTED POROUS POLYMERIC MATERIAL

BACKGROUND OF THE INVENTION

This invention generally relates to medical devices, and particularly to intracorporeal devices for therapeutic or diagnostic uses such as balloon catheters, and vascular grafts.

In percutaneous transluminal coronary angioplasty (PTCA) procedures, a guiding catheter is advanced until the distal tip of the guiding catheter is seated in the ostium of a desired coronary artery. A guidewire, positioned within an inner lumen of a dilatation catheter, is first advanced out of the distal end of the guiding catheter into the patient's coronary artery until the distal end of the guidewire crosses a lesion to be dilated. Then the dilatation catheter having an inflatable balloon on the distal portion thereof is advanced into the patient's coronary anatomy, over the previously introduced guidewire, until the balloon of the dilatation catheter is properly positioned across the lesion. Once properly positioned, the dilatation balloon is inflated with fluid one or more times to a predetermined size at relatively high pressures (e.g. greater than 8 atmospheres) so that the stenosis is compressed against the arterial wall to open up the passageway. Generally, the inflated diameter of the balloon is approximately the same diameter as the native diameter of the body lumen being dilated so as to complete the dilatation but not overexpand the artery wall. Substantial, uncontrolled expansion of the balloon against the vessel wall can cause trauma to the vessel wall. After the balloon is finally deflated, blood flow resumes through the dilated artery and the dilatation catheter can be removed therefrom.

In such angioplasty procedures, there may be restenosis of the artery, i.e., reformation of the arterial blockage, which necessitates either another angioplasty procedure or some other method of repairing or strengthening the dilated area. To reduce the restenosis rate and strengthen the dilated area, physicians frequently implant a stent inside the artery at the site of the lesion. Stents may also be used to repair vessels having an intimal flap or dissection or to generally strengthen a weakened section of a vessel. Stents are usually delivered to a desired location within a coronary artery in a contracted condition on a balloon of a catheter which is similar in many respects to an angioplasty balloon catheter, and expanded to a larger diameter by expansion of the balloon. The balloon is deflated to remove the catheter and the stent left in place within the artery at the site of the dilated lesion. Stent covers commonly provided on an inner or an outer surface of the stent have been used in, for example, the treatment of pseudo-aneurysms and perforated arteries and to prevent prolapse of plaque, and generally comprise a cylindrical tube of synthetic or natural material. Similarly, vascular grafts comprising cylindrical tubes commonly made from tissue or synthetic materials such as polyester, expanded polytetrafluoroethylene, and DACRON, are configured to be implanted in vessels to strengthen or repair the vessel, or used in an anastomosis procedure to connect vessel segments together.

In the design of catheter balloons, characteristics such as strength, compliance, and profile of the balloon are carefully tailored depending on the desired use of the balloon catheter, and the balloon material and manufacturing procedure are chosen to provide the desired balloon characteristics. A variety of polymeric materials are conventionally used in catheter balloons. Use of polymeric materials such as PET that do not stretch appreciably consequently necessitates that the balloon is formed by blow molding, and the deflated balloon material is folded around the catheter shaft in the form of wings, prior to inflation in the patient's body lumen. However, it can be desirable to employ balloons, referred to as formed-in-place balloons, that are not folded prior to inflation, but which instead readily expand to the working diameter within the patient's body lumen from a generally cylindrical or tubular shape (i.e., essentially no wings) that conforms to the catheter shaft.

Catheter balloons formed of expanded polytetrafluoroethylene (ePTFE) expanded in place within the patient's body lumen without blow molding the ePTFE tubing have been disclosed. Prior disclosed methods of forming the ePTFE balloon involve wrapping a sheet of ePTFE on a mandrel and then heating the wrapped sheet to fuse the layers of wrapped material together. However, one difficulty has been further processing the resulting ePTFE tube after the layers of wrapped material are fused together without damaging the ePTFE tube.

SUMMARY OF THE INVENTION

This invention is directed to a method of making a catheter balloon or other expandable tubular medical device or component thereof formed of a compacted porous polymeric material, in which a tube of porous polymeric material is axially compacted by positioning heat shrink material on the porous polymeric tube, and heating the heat shrink material to decrease the length and diameter of the heat shrink material. Preferably, the heat shrink material axially compacts the porous polymeric tube without increasing the outer diameter of the porous polymeric tube.

The method of the invention generally comprises positioning heat shrink material on a tube of porous polymeric material with a mandrel in the porous polymeric tube lumen, and shrinking the heat shrink material by heating the heat shrink material on the porous polymeric tube. The heat shrink material shrinks axially to compact the porous polymeric tube, and shrinks radially to radially restrain the outer diameter of the porous polymeric tube during the axial compaction. Thus, the outer diameter of the porous polymeric tube preferably does not increase during the axial compaction. As a result, the porous polymeric tube compacts uniformly and without buckling or bunching, which provides an improved compacted porous polymeric tube. The compacted porous polymeric tube is removed from the mandrel, typically after the shrunk material is removed therefrom, to form a layer of an expandable medical device or component. In one embodiment, the resulting compacted porous polymeric layer is then bonded to a second layer or liner, to form a multilayered expandable medical device or component such as a balloon for a catheter. By preventing or minimizing buckling or other surface irregularities during compaction, the method of the invention facilitates securely bonding the resulting compacted porous polymeric tube to the second layer. Additionally, the method of the invention provides uniform percent compaction of the porous polymer tube, unlike methods in which the amount of compaction varies along the length of the tube due to buckling in the tube during the compaction process.

The heat shrink material of the invention has a desired amount of axial shrinking and radial shrinking during the heating thereof while on the porous polymeric tube. The heat shrink material shrinks axially and radially to longitudinally compact the underlying porous tube over the entire length of the porous tube while providing the necessary force in the radial direction to prevent radial growth of the porous polymeric tube. The amount of axial or radial shrinking is expressed as a percentage of the original length or diameter, respectively, prior to heating the heat shrink material. The resulting amount of longitudinal compaction produced in the porous tube is expressed herein as a percentage length reduction. Thus, a porous polymeric tube having a precompaction length (i.e., the length of the tube just prior to being longitudinally compacted in accordance with the invention) of 2 cm, which is subsequently longitudinally compacted to a length of 1 cm, has a longitudinal compaction of 50% (i.e., (2 cm−1 cm)÷2 cm). In one presently preferred embodiment, the heat shrink material axially heat shrinks by about 15 to about 50%, to produce a compacted porous polymeric tube having a longitudinal compaction of about 15 to about 50%.

In one embodiment, the heat shrink material positioned on the porous polymeric tube comprises a tube of cross-linked polymeric material which has been radially expanded and heated in the radially expanded configuration. The radially expanded tube is positioned on the porous polymeric tube preferably by longitudinally stretching the radially expanded tube down onto the porous polymeric tube. The cross-linked polymeric tube, longitudinally and radially expanded from an original length and diameter, will heat shrink back to the original length and diameter as a result of the cross-linking plastic memory features. Consequently, the cross-linked tube can be longitudinally stretched and radially expanded by a specific amount to provide a heat shrink tube which axially and radially shrinks by a desired amount during heating. Unlike conventional commercially available heat shrink tubing which is typically manufactured to maximize the amount of radial shrinkage and minimize the amount of longitudinal shrinkage, the heat shrink tube of the invention provides a desired large amount of axial shrinking and typically a relatively small amount of radial shrinking. In one embodiment, the heat shrink tube of expanded cross-linked material axially heat shrinks by about 15 to about 50% and radially heat shrinks by about 30 to about 60%, to produce a compacted porous polymeric tube having a longitudinal compaction of about 15 to about 50% and radial compaction of about 27 to about 40%. A variety of suitable commercially available cross-linked polymeric material may be used, including in one preferred embodiment a low density polyethylene (LDPE) such as linear low density polyethylene (LLDPE). Preferably, the cross-linked tube has a wall thickness which is not less than a minimum wall thickness required to provide improved uniform compaction without producing a wrinkled or buckled compacted porous tube, which in one embodiment is a minimum wall thickness of about 0.004 inches.

In another embodiment, the heat shrink material positioned on the porous polymeric tube comprises a sheet of biaxially oriented heat shrink material wrapped around the porous polymeric tube at least one time, and typically multiple times. The biaxial (i.e., radial and axial) orientation provides the heat shrink material with radial and axial shrinkage during heat shrinking thereof. In one embodiment, the biaxially oriented heat shrink material wrapped or otherwise positioned on the porous polymeric tube axially heat shrinks by about 10 to about 70%, and more specifically by about 10 to about 50%, and radially heat shrinks by about 10 to about 70%, and more specifically by about 10 to about 50%, to produce a compacted porous polymeric tube having a longitudinal compaction of about 10 to about 70%, and more specifically about 10 to about 50%, and radial compaction of about 1 to about 40%. A variety of suitable commercially available biaxially oriented heat shrink material may be used including polyolefins such as CLYSAR available from Bemis, and heat shrink tubing available from 3M.

In a presently preferred embodiment, the porous polymeric material is selected from the group consisting of expanded polytetrafluoroethylene (ePTFE), an ultra high molecular weight polyolefin including ultra high molecular weight polyethylene, porous polyolefins including polyethylene and polypropylene, and porous polyurethane. In one embodiment, the porous material has a node and fibril microstructure. ePTFE and ultra high molecular weight polyethylene (also referred to as "expanded ultra high molecular weight polyethylene") typically have a node and fibril microstructure, and are not melt extrudable. The node and fibril microstructure, when present, is produced in the porous material using conventional methods, and the tube of porous polymeric material preferably has the desired microstructure (e.g., porous and/or node and fibril) before the heat shrink material is positioned thereon. However, a variety of suitable porous polymeric materials can be used in the method of the invention including conventional catheter balloon materials which are melt extrudable. In one presently preferred embodiment, the porous polymeric material cannot be formed into a balloon by conventional balloon blow molding, and is formed into a balloon by bonding a sheet of the porous polymeric material together to form a tubular member, and preferably provided with a nonporous second layer or liner to form an inflatable balloon. The porous polymeric tube is typically formed by wrapping a sheet of porous polymeric material on a mandrel and heating the wrapped sheet to fuse sections of the sheet together.

The compaction of the porous polymeric tube, in accordance with the method of the invention using heat shrink material, preferably imparts desired performance characteristics in the resulting device or component. In one embodiment, the heat shrink material compacts the porous polymeric tube to produce a balloon or other device or component having improved dimensional stability and a specific desired compliance curve during inflation of the balloon. For example, in one embodiment the compaction produces a balloon with a controlled length by controlling the axial shortening or growth and the diameter growth of the balloon.

In a presently preferred embodiment, the tubular medical device or medical device tubular component is an inflatable balloon for a catheter. A balloon formed according to the method of the invention can be used on a variety of suitable balloon catheters including coronary and peripheral dilatation catheters, stent delivery catheters, drug delivery catheters and the like. Although discussed below primarily in terms of the embodiment in which the medical device tubular component is an inflatable member such as a balloon for a catheter, it should be understood that other expandable medical devices and components are included within the scope of the invention including stent covers and vascular grafts.

The method of the invention provides for improved manufacture of a compacted porous polymeric tube for use in an expandable medical device or component. The porous polymeric tube is uniformly compacted a desired amount without buckling as it is longitudinally compacted by the heat shrink material therearound. Moreover, the heat shrink material is easy to apply and remove from the porous polymeric tube without damaging the porous polymeric tube, for improved manufacturability and reduced damage to the compacted tube. These and other advantages of the invention will become more apparent from the following detailed description and accompanying exemplary figures.

BRIEF DESCRIPTION OF THE DRAWINGS

FIG. 3A is an elevational view, partially in section, of the heat shrink tube of FIG. 2A after being radially expanded and positioned on the tube of porous polymeric material, and prior to being longitudinally stretched on the porous polymeric tube, with the longitudinally stretched heat shrink tube illustrated in dashed lines.

FIG. 3B is a transverse cross sectional view of the assembly shown in FIG. 3A, taken along line 3B—3B.

FIG. 4 is an elevational view, partially in section, of the heat shrink tube of FIG. 3A after being longitudinally stretched on the porous polymeric tube, and prior to being heated to heat shrink and thereby compact the porous polymeric tube.

FIG. 5 illustrates an alternative embodiment in which the heat shrink material is a sheet of biaxially oriented polymeric material with the porous polymeric tube on a mandrel rolled therein.

DETAILED DESCRIPTION OF THE INVENTION

Figure 1B:
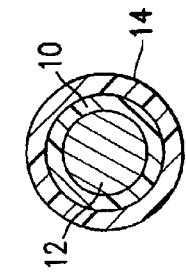
FIG. 1B is a transverse cross sectional view of the assembly shown in FIG. 1A, taken along line 1B—1B.
Figure 1A:
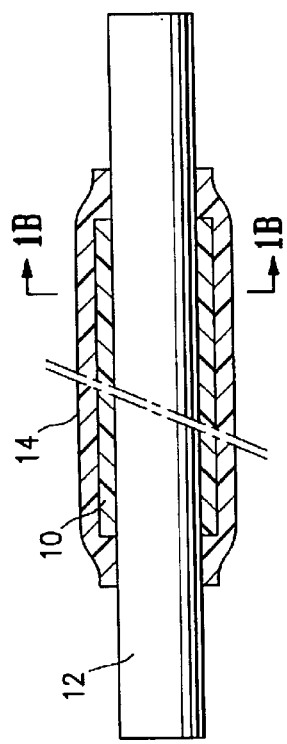
FIG. 1A illustrates, partially in section, an assembly of a porous polymeric tube on a mandrel with a tube of heat shrink material on the porous polymeric tube, after the heat shrink tube is heated to compact the porous polymeric tube in a method embodying features of the invention.

FIG. 1A illustrates a compacted tube 10 formed of porous polymeric material tube on a mandrel 12, after a tube 14 of heat shrink material has been heated to shrink the tube 14 and thereby compact the porous polymeric tube 10, in a method of making a tubular medical device of component formed of the compacted porous polymeric tube 10, embodying features of the invention. FIG. 1B is a transverse cross sectional view of the assembly of FIG. 1A, taken along line 1B—1B.

Figure 2B:
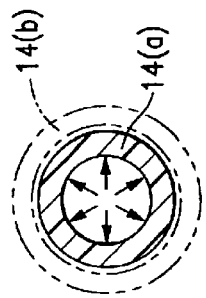
FIG. 2B is a transverse cross sectional view of the assembly shown in FIG. 2A, taken along line 2B—2B.
Figure 2A:
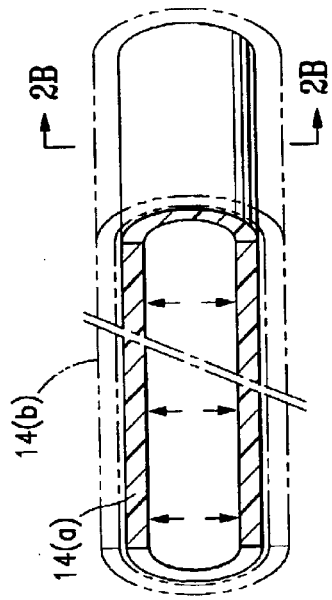
FIG. 2A is a longitudinal cross section of the heat shrink tube of FIG. 1A before being radially expanded and placed around the porous polymeric tube of FIG. 1A, with the radially expanded heat shrink tube illustrated in dashed lines.

In the method of FIG. 1A, the heat shrink tube 14 is a tube of cross-linked polymeric material which has been radially expanded before being positioned on the porous polymeric tube 10, and then positioned on the porous polymeric tube 10 and longitudinally stretched down onto the porous polymeric tube 10 prior to being heat shrunk thereon to compact the porous polymeric tube 10. FIG. 2A illustrates the cross-linked polymeric tube 14(a) prior to being radially expanded, with the radially expanded cross-linked polymeric tube 14(b) illustrated in dashed lines in FIG. 2A. In a presently preferred embodiment, the cross-linked polymeric material of tube 14(a) is polyethylene, although a variety of suitable cross-linked polymers may be used including polypropylene, polytetrafluoroethylene (PTFE), and PVC. The cross-linked polymeric tube 14(a) has a wall thickness of about 0.01 to about 0.09 inches, preferably about 0.05 to about 0.06 inches. The cross-linked polymeric tube 14(a) is radially expanded to provide the desired amount of radial shrinkage during heating thereof on the porous polymeric tube 10. The cross-linked polymeric tube 14(a) is typically radially expanded by about 30 to about 90% of the original diameter to form radially expanded cross-linked polymeric tube 14(b). Specifically, in one embodiment in which the original inner diameter of the cross linked polymeric tube 14(a) is about 0.01 to about 0.03 inches, the tube 14(a) is radially expanded to an inner diameter of about 0.04 to about 0.07 inches. The tube 14(a) can be radially expanded using a variety of suitable methods. The tube 14(a) is typically radially expanded pressurizing the interior of the tube, as for example by blow molding the tube 14(a) by heating the tube 14(a) in a mold and introducing an inflation medium such as a gas or liquid into the interior of the tube to radially expand the tube 14(a). FIG. 2B is a transverse cross sectional view of the assembly of FIG. 2A, taken along line 2B—2B.

The radially expanded cross-linked polymeric tube 14(b) is then positioned on the tube 10 of porous polymeric material to be compacted. FIG. 3A illustrates the radially expanded cross-linked polymeric tube 14(b) positioned on the tube of porous polymeric material with mandrel 12 in the lumen of the tube 10. The tube 14(b) is then longitudinally stretched down onto the porous polymeric tube 10 to provide the desired amount of axial shrinkage during heating thereof on the porous polymeric tube 10. The cross-linked polymeric tube 14(b) is typically longitudinally stretched, i.e., axially elongated, by about 1 to about 50% of the original length of tube 14(b), to form longitudinally stretched and radially expanded cross-linked polymeric tube 14(c) (see FIG. 4). Specifically, in one embodiment, the tube 14(b) is longitudinally stretched to a length of about 10 to about 20 cm to form tube 14(c). The tube 14(b) can be longitudinally stretched using a variety of suitable methods, and is preferably longitudinally stretched by being pulled at either end. The tube 14(b) is typically longitudinally stretched at an elevated temperature of about 200 to about 300° F., to form tube 14(c). FIG. 3B is a transverse cross sectional view of the assembly of FIG. 3A, taken along line 3B—3B.

FIG. 4 illustrates the longitudinally stretched and radially expanded tube 14(c) on the porous polymeric tube 10 and mandrel 12 therein, prior to heat shrinking the tube 14(c) to compact the porous polymeric tube 10. Although not illustrated in FIG. 4, the tube 14(c) is typically fixed in the stretched configuration by attaching fixing members such as ties or clamps (not shown) on the ends of the longitudinally stretched tube 14(c). The longitudinally stretched and radially expanded tube 14(c) around the porous polymeric tube 10 typically has a wall thickness of about 0.004 to about 0.02 inches, preferably about 0.01 to about 0.015 inches. The tube 14(c) is heated to an elevated temperature at or above the glass transition temperature of the cross-linked or partially cross-linked polymer to heat shrink the tube 14(c) and thereby compact the porous polymeric tube 10, to form the compacted tube 10 as illustrated in FIG. 1. In a presently preferred embodiment, the assembly illustrated in FIG. 4 is heated using a heating nozzle traversed along and around the outer surface of the heat shrink tube 14(c). However, a variety of suitable heating methods may be used including heating in an oven. The tube 14(c) typically axially shrinks back to the original pre-longitudinally stretched length, and radially shrinks back to the original pre-radially expanded diameter. In a presently preferred embodiment, the tube axially heat shrinks by about 10 to about 50%, and radially heat shrinks by about 10 to about 50%, to produce a compacted porous polymeric tube 10 having a longitudinal compaction of about 10 to about 50% and a radial compaction of about 5 to about 15%.

FIG. 5 illustrates an alternative embodiment in which the porous polymeric tube 10 is compacted using heat shrink material comprising a sheet of biaxially oriented heat shrink polymeric material 24 wrapped around the tube 10 on mandrel 12. FIG. 5 illustrates the porous polymeric tube 10 on mandrel 12 being rolled in the sheet of heat shrink material 24, so that multiple layers of heat shrink material are provided around the tube 10. Increasing the number of layers of heat shrink material increases the compression force provided by the heat shrink material during heat shrinking thereof. In a presently preferred embodiment, the heat shrink sheet 24 is wrapped around the porous polymeric tube 10 about 5 to about 20 times (to provide the same number of layers of heat shrink material therearound). In a presently preferred embodiment, the biaxially oriented heat shrink material forming sheet 24 is a polyolefin such as CLYSAR, although a variety of suitable heat shrink polymers may be used including polypropylene, PTFE, PVC, and copolymers of polyolefins. The wall thickness of the heat shrink sheet 24 prior to being heat shrunk is typically about 0.004 to about 0.01 inches, or about 75 to about 200 gauge. The heat shrink sheet 24 is wrapped around the porous polymeric tube 10 so that the ends of the wrapped sheet 24 extend beyond the ends of the tube 10 and onto the mandrel 12. In the embodiment illustrated in FIG. 5, the heat shrink sheet 24 has a width longer than the length of the porous polymeric tube 10, so that the sheet 24 covers the tube 10. However, in an alternative embodiment (not shown), the sheet 24 has a width not greater than the length of the tube 10, so that the sheet 24 must be spirally wrapped along the length of the tube 10 to fully cover the tube 10. The wrapped sheet 24 is heated to an elevated temperature at or above the glass transition temperature of the heat shrink polymer to heat shrink the wrapped sheet 24 and thereby compact the porous polymeric tube 10, to form the compacted tube 10 as discussed above in relation to the embodiment of FIG. 4. In a presently preferred embodiment the wrapped sheet 14 axially heat shrinks by about 30 to about 90%, and radially heat shrinks by about 10 to about 50%, to produce a compacted porous polymeric tube 10 having a longitudinal compaction of about 5 to about 30% and a radial compaction of about 0 to about 10%.

The porous polymeric tube 10 may be processed prior to being longitudinally compacted in accordance with the invention. For example, in one embodiment, the tube 10 is preferably longitudinally stretched prior to being longitudinally compacted by the heat shrink tube 14 or wrapped heat shrink sheet 24.

The thus compacted porous polymeric tube 10 is removed from the mandrel 12, before or after the heat shrunk tube 14 or wrapped sheet 24 is removed therefrom. The compacted porous polymeric tube 10 may be further processed to form the completed tubular medical device or component. For example, in one embodiment in which the compacted porous polymeric tube forms a layer of a catheter multilayered balloon, the compacted porous polymeric tube is secured to or otherwise combined with a nonporous second layer to form the multilayered balloon.

Figure 6:
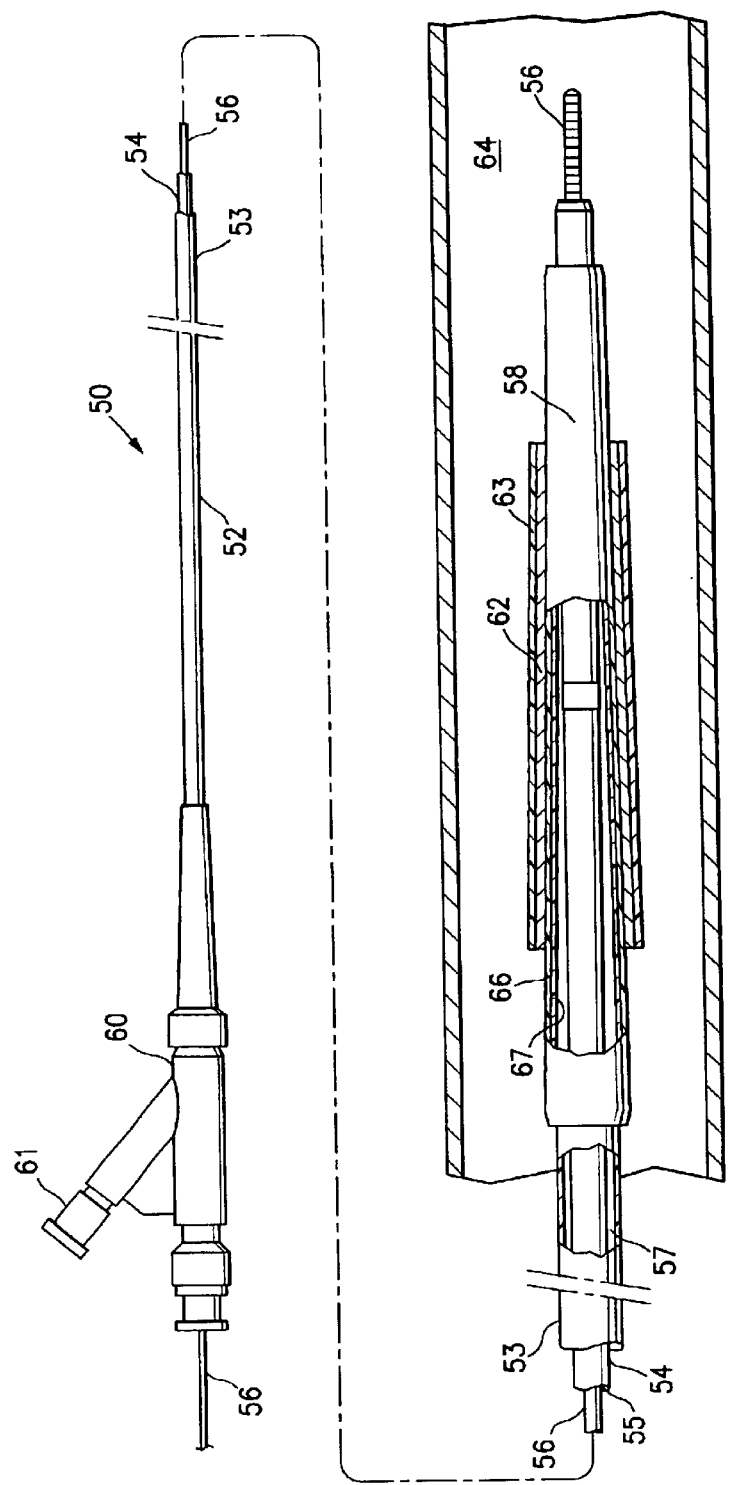
FIG. 6 is an elevational view, partially in section, of a stent delivery balloon catheter having a balloon with an outer layer formed of a compacted porous polymeric layer formed according to a method which embodies features of the invention.

FIG. 6 illustrates an over-the-wire type stent delivery balloon catheter 50 embodying features of the invention, having a balloon formed according to a method of the invention. Catheter 50 generally comprises an elongated catheter shaft 52 having an outer tubular member 53 and an inner tubular member 54. Inner tubular member 54 defines a guidewire lumen 55 configured to slidingly receive a guidewire 56, and the coaxial relationship between outer tubular member 53 and inner tubular member 54 defines annular inflation lumen 57. An inflatable balloon 58 disposed on a distal section of catheter shaft 52 has a proximal skirt section sealingly secured to the distal end of outer tubular member 53 and a distal skirt section sealingly secured to the distal end of inner tubular member 54, so that its interior is in fluid communication with inflation lumen 57. An adapter 60 at the proximal end of catheter shaft 52 is configured to provide access to guidewire lumen 55, and to direct inflation fluid through arm 61 into inflation lumen 57. FIG. 1 illustrates the balloon 58 prior to complete inflation, with an expandable stent 62, having a tubular cover 63 thereon, mounted on a working length of the balloon 58. The distal end of the catheter may be advanced to a desired region of a patient's body lumen 64 in a conventional manner, and balloon 58 inflated to expand the covered stent 62, and the balloon deflated, leaving covered stent 62 implanted in the body lumen 64.

In the embodiment illustrated in FIG. 1, balloon 58 has a first layer 66 and a second layer 67. In a presently preferred embodiment, the balloon 58 first layer 66 comprises a fluoropolymeric material, which in one embodiment is a porous fluoropolymeric material, and preferably a microporous fluoropolymeric material having a node and fibril microstructure, such as ePTFE. In the embodiment illustrated in FIG. 1, first layer 66 is formed of ePTFE, and the second layer 67 is formed of a polymeric material preferably different from the polymeric material of the first layer 66. Although discussed below in terms of one embodiment in which the first layer 66 is formed of ePTFE, it should be understood that in other embodiments the first layer may comprise other materials. The second layer 67 is preferably formed of an elastomeric material, including polyurethane elastomers, silicone rubbers, styrene-butadiene-styrene block copolymers, polyamide block copolymers, and the like. In a preferred embodiment, layer 67 is an inner layer relative to layer 66, although in other embodiments it may be an outer layer. Layer 67 formed of an elastomeric material limits or prevents leakage of inflation fluid through the microporous ePTFE to allow for inflation of the balloon 58, and expands elastically to facilitate deflation of the balloon 58 to a low profile deflated configuration. The elastomeric material forming layer 67 may consist of a separate layer which neither fills the pores nor disturbs the node and fibril structure of the ePTFE layer 66, or it may at least partially fill the pores of the ePTFE layer 66.

In the embodiment in which the porous polymeric tube is formed of ePTFE, the tube 10 is preferably heated at a temperature sufficient to sinter the ePTFE in a stretched configuration and again in the compacted configuration, prior to being removed from mandrel 12. The sintering temperature is typically greater than the elevated temperature used to heat shrink the heat shrink tube 14 or wrapped sheet 24 thereon, so that the tube 10 is not sintered during the heat shrinking of the heat shrink material thereon. In one embodiment, to provide the desired properties such as the desired dimension, and dimensional stability (i.e., to minimize changes in length occurring during inflation of the tubular medical device or component formed by the compacted porous polymeric tube (e.g., the compacted ePTFE tube), the porous polymeric tube 10 is stretched, sintered, compacted according to a method of the invention, and then sintered again.

The dimensions of catheter 50 are determined largely by the size of the balloon and guidewires to be employed, catheter type, and the size of the artery or other body lumen through which the catheter must pass or the size of the stent being delivered. Typically, the outer tubular member 53 has an outer diameter of about 0.025 to about 0.04 inch (0.064 to 0.10 cm), more specifically about 0.037 inch (0.094 cm), and a wall thickness of about 0.002 to about 0.008 inch (0.0051 to 0.02 cm), more specifically about 0.003 to about 0.005 inch (0.0076 to 0.013 cm). The inner tubular member 54 typically has an inner diameter of about 0.01 to about 0.018 inch (0.025 to 0.046 cm), more specifically about 0.015 to about 0.016 inch (0.038 to 0.04 cm), and a wall thickness of 0.002 to 0.005 inch (0.005 to 0.013 cm). The overall working length of the catheter 50 may range from about 100 to about 150 cm, and is typically about 143 cm. The balloon 58 typically has a length of about 0.5 cm to about 6 cm, and an inflated working diameter of about 2 to about 10 mm.

Although the shaft is illustrated as having an inner and outer tubular member, a variety of suitable shaft configurations may be used including a dual lumen extruded shaft having a side-by-side lumens extruded therein. Similarly, although the embodiment illustrated in FIG. 6 is an over-the-wire stent delivery catheter, the catheter may comprise other types of intravascular catheters, such as a rapid exchange balloon catheter. Rapid exchange catheters generally comprise a distal guidewire port in a distal end of the catheter, a proximal guidewire port in a distal shaft section and typically spaced a substantial distance from the proximal end of the catheter, and a short guidewire lumen extending between the proximal and distal guidewire ports in the distal section of the catheter.

While the present invention is described herein in terms of certain preferred embodiments, those skilled in the art will recognize that various modifications and improvements may be made to the invention without departing from the scope thereof. Moreover, although individual features of one embodiment of the invention may be discussed herein or shown in the drawings of the one embodiment and not in other embodiments, it should be apparent that individual features of one embodiment may be combined with one or more features of another embodiment or features from a plurality of embodiments.

What is claimed is:

1. A method of making a tubular medical device or component formed of a compacted porous polymeric material, comprising:
   a) positioning heat shrink material on a tube of porous polymeric material, with a mandrel in a lumen of the porous polymeric tube;
   b) shrinking the heat shrink material by heating the heat shrink material on the porous polymeric tube, to axially compact the porous polymeric tube without increasing the outer diameter of the porous polymeric tube; and
   c) removing the shrunk material from the compacted porous polymeric tube and removing the compacted porous polymeric tube from the mandrel, to form a compacted porous polymeric layer of an expandable tubular medical device or component having at least one layer.

2. The method of claim 1 wherein b) comprises radially and axially shrinking the heat shrink material.

3. The method of claim 1 wherein b) comprises axially shrinking the heat shrink material by about 15 to about 50%.

4. The method of claim 1 wherein the heat shrink material is a sheet of biaxially oriented heat shrink material and a) comprises wrapping the sheet around the porous polymeric tube.

5. The method of claim 4 wherein b) comprises axially shrinking the heat shrink material by about 10 to about 70%.

6. The method of claim 5 wherein the axially compacted porous polymeric tube has an axial compaction of about 10 to about 50%.

7. The method of claim 1 wherein the heat shrink material is a tube of cross-linked polymeric material which, before a), was radially expanded and heated in the radially expanded configuration, and b) comprises longitudinally stretching the radially expanded tube of heat shrink material down onto the porous polymeric tube.

8. The method of claim 7 wherein b) comprises axially shrinking the heat shrink material by about 10 to about 70%.

9. The method of claim 8 wherein the axially compacted porous polymeric tube has an axial compaction of about 10 to about 50%.

10. The method of claim 1 wherein the porous polymeric tube is formed of expanded polytetrafluoroethylene, and the b) comprises heating the assembly of the heat shrink material and porous polymeric tube at 90 to about 225° C. for about 0.5 to about 10 minutes.

11. The method of claim 1 wherein the medical device component is a catheter balloon and including, after c) securing a liner to the compacted porous polymeric layer to form the catheter balloon.

12. A method of making a tubular medical device or component formed of a compacted porous polymeric material, comprising:
    a) radially expanding a tube of cross-linked polymeric material;
    b) longitudinally stretching the radially expanded tube to form a heat shrink tube, on a tube of porous polymeric material with a mandrel in a lumen of the porous polymeric tube;
    c) shrinking the heat shrink tube by heating the heat shrink tube on the porous polymeric tube, to axially compact the porous polymeric tube without increasing the outer diameter of the porous polymeric tube; and
    d) removing the shrunk tube from the compacted porous polymeric tube, and removing the compacted porous polymeric tube from the mandrel, to form a compacted porous polymeric layer of an expandable tubular medical device or component having at least one layer.

13. The method of claim 12 wherein the tube of cross-linked polymeric material is a polymer selected from the group consisting of polyolefins, polytetrafluoroethylene, and polyvinyl chloride, and including before b), heating the tube at about 90 to about 225° C. in the radially expanded configuration.

14. The method of claim 12 wherein radially expanding the tube of cross-linked polymeric material comprises radially expanding the tube by about 90 to about 200%.

15. The method of claim 14 wherein b) comprises longitudinally stretching the radially expanded heat shrink tube at ambient temperature, and the tube is stretched by about 10 to about 50%, to form a heat shrink tube which axial heat shrinks by about 10 to about 50% and radially heat shrinks by about 5 to about 15%.

16. The method of claim 15 wherein c) comprises axially compacting the tube by about 10 to about 50%.

17. The method of claim 12 wherein the tube of porous polymeric material on the mandrel is longitudinally stretched on the mandrel and heated in the longitudinally stretched configuration before b).

18. The method of claim 12 wherein the heat shrink tube has a thickness of about 0.004 to about 0.02 inches after b) and before c), and c) comprises uniformly compacting the porous polymeric tube without buckling the porous polymeric tube.

19. A method of making a compacted porous polymeric layer of a catheter balloon, comprising:
   a) heating and radially expanding a tube of cross-linked polymeric material;
   b) longitudinally stretching the radially expanded heat shrink tube to form a heat shrink tube, on a tube of porous polymeric material, with a mandrel in a lumen of the porous polymeric tube;
   c) heating the heat shrink tube on the porous polymeric tube so that the heat shrink tube axially shrinks by about 10 to about 50% and radially shrinks by 10 about 5 to about 15%, to axially compact the porous polymeric tube by about 10 to about 50% without increasing the outer diameter of the porous polymeric tube; and
   d) removing the shrunk tube from the compacted porous polymeric tube, and removing the compacted porous polymeric tube from the mandrel, to form a compacted porous polymeric layer of a catheter balloon having at least one layer.

* * * * *